United States Patent
Bay et al.

(10) Patent No.: US 6,848,481 B1
(45) Date of Patent: Feb. 1, 2005

(54) METHOD AND APPARATUS FOR REMOVING HAZARDOUS LIQUID FROM PETROLEUM TANKER TRAILER DELIVERY/LOADING PIPING

(75) Inventors: Andrew T. Bay, Grant, MI (US); Scott Bradley Schugars, Muskegon, MI (US)

(73) Assignee: EBW, Inc., Muskegon, MI (US)

( * ) Notice: Subject to any disclaimer, the term of this patent is extended or adjusted under 35 U.S.C. 154(b) by 0 days.

(21) Appl. No.: 10/692,471

(22) Filed: Oct. 23, 2003

Related U.S. Application Data
(60) Provisional application No. 60/422,359, filed on Oct. 30, 2002.

(51) Int. Cl.[7] ................................ B65B 1/04
(52) U.S. Cl. ..................... 141/65; 141/86; 141/94; 141/59; 220/86.1; 116/276
(58) Field of Search .................. 141/59, 65, 86–88, 141/290, 311 A, 94, 115–126; 220/86.1; 116/276

(56) References Cited

U.S. PATENT DOCUMENTS

| | | | |
|---|---|---|---|
| 3,981,325 A | 9/1976 | Robinson et al. ........... 137/587 |
| 3,999,567 A | 12/1976 | Robinson ..................... 137/68 |
| 5,033,494 A | 7/1991 | Harbolt et al. ................. 137/1 |
| 5,139,175 A | 8/1992 | Krysel et al. ............... 222/195 |
| 5,243,929 A * | 9/1993 | Brown et al. ............... 116/276 |
| 5,377,715 A | 1/1995 | Andenmatten et al. ....... 137/15 |
| 5,462,078 A | 10/1995 | Andenmatten et al. ..... 137/209 |
| 5,515,890 A | 5/1996 | Koeninger ................... 141/94 |
| 5,531,240 A | 7/1996 | Kelada ......................... 137/15 |
| 5,735,560 A | 4/1998 | Bowen et al. ................ 293/15 |
| 5,878,767 A | 3/1999 | Etling et al. ................. 137/15 |
| 6,244,287 B1 * | 6/2001 | Hill et al. ...................... 137/2 |
| 6,343,896 B1 | 2/2002 | Goodier et al. .............. 406/43 |
| 6,538,261 B1 * | 3/2003 | McConnel et al. ......... 250/577 |
| 2002/0195162 A1 | 12/2002 | Bowan et al. ................. 141/1 |
| 2002/0197117 A1 | 12/2002 | Bowan et al. .............. 417/395 |

* cited by examiner

*Primary Examiner*—Steven O. Douglas
(74) *Attorney, Agent, or Firm*—Young & Basile, P.C.

(57) ABSTRACT

A method and system is provided for removing hazardous liquid from a wet line of a cargo tanker truck. The system includes a sight glass module positioned at the outboard end of the wet line. The sight glass module includes a vent, a drain, and an optical sensor. When the optical sensor senses liquid in the module, a control system operates to pump the liquid from the drain into the cargo tank.

12 Claims, 3 Drawing Sheets

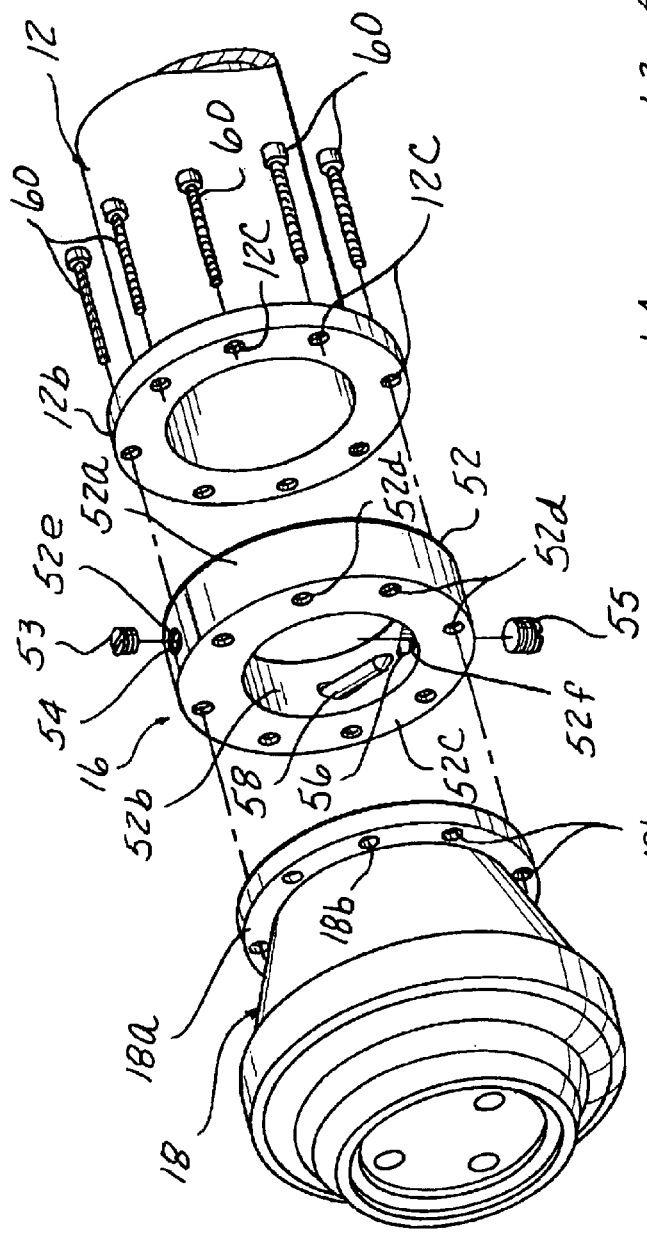
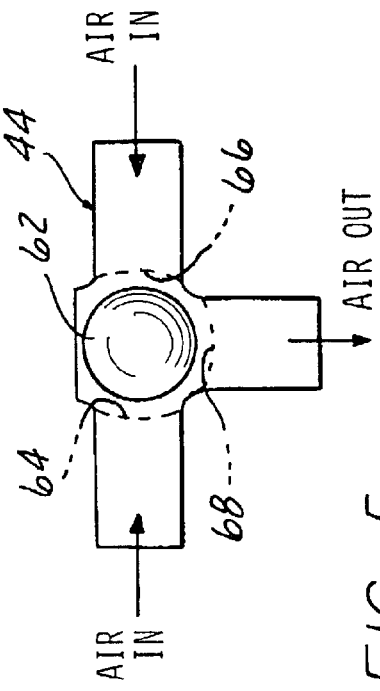

METHOD AND APPARATUS FOR REMOVING HAZARDOUS LIQUID FROM PETROLEUM TANKER TRAILER DELIVERY/LOADING PIPING

This application claims priority of U.S. Provisional Patent Application Ser. No. 60/422,359 filed on Oct. 30, 2002.

BACKGROUND OF THE INVENTION

A petroleum tanker trailer utilizes large diameter piping or "wet lines" for delivery of flammable product to service stations as well as for loading product into the trailer. After the trailer is loaded, up to 75 gallons of flammable liquid remain in the wet lines. Accordingly a collision proximate the wet lines can spill up to 75 gallons of flammable liquid and can cause severe injury or death along with major property damage.

Various approaches have been proposed to address this problem. One solution is to drain the fluid from the wet lines after filling. The problem with this approach is one of weights and measures. Since the tanker trailer is effectively considered as having received the fuel in the wet lines, pumping this fuel back into the supply tank produces accounting headaches and requires that the fuel that is siphoned off be measured and credit given accordingly. This is both a complex and costly undertaking.

Another approach is to provide a protective cage around the wet lines. This however is economically unattractive since it adds significant weight to the tanker trailer which translates into lower fuel cavity capacity.

Yet another approach is to force a gas into the wet lines to force the liquid remaining in the wet lines after the filling process back into the tank of the tanker trailer. This procedure requires tremendous pressure to force the fuel back into the housing tank against the downward gravity force of the fuel in the housing tank. As a result, powerful pumps or other mechanisms have to be made available, greatly adding to the cost of the filling and unloading operations.

Another approach is to provide a suction pump which is controlled by the truck supplied air and which is operative to pump liquid in the wet lines from the wet lines back into the holding tank on the trailer itself. This approach typically utilizes a sensor which senses the presence of liquid in the wet lines and actuates the pump to drain the wet lines. Although this approach is generally satisfactory it requires, for each truck, that the API (American Petroleum Institute) adaptor heads for each truck be replaced with a customized API head to accommodate the evacuation system.

SUMMARY OF THE INVENTION

This invention relates to an improved wet line evacuation system for a petroleum transport.

More specifically, this invention relates to a cost-effective evacuation system for a liquid petroleum transport.

The system of the invention is intended for purging liquid from an external conduit of a bottom loading cargo tank wherein the system comprises a coupling device proximate a free end of the conduit, a drain, a return line interconnecting the drain and the cargo tank, a sensor operative to sense liquid in the conduit, a pump in the return line, and a control system operative in response to a signal from the sensor to actuate the pump.

According to the invention, the sensor and the drain are located in a module positioned between the free end of the conduit and the coupling device.

According to a further feature of the invention, the system further includes a vapor return line extending between the cargo tank and the external conduit and connected to the external conduit by a fitting and the fitting is located in the module. This arrangement eliminates the need to purchase customized and expensive API heads in order to achieve an evacuation capability.

According to a further feature of the invention, the module comprises a sight glass positioned between the free end of the conduit and the coupling device. This arrangement further reduces the cost of providing the evacuation capability by utilizing existing system hardware.

According to a further feature of the invention, the sensor and drain are positioned in an annular wall of the sight glass. This specific arrangement simplifies packaging of the evacuation system components and further reduces the cost of the system.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a perspective exploded view of the API head, sight glass module, and wet line of the system;

FIG. 5 is a schematic view of a shuttle valve utilized in the invention.

DETAILED DESCRIPTION OF THE PREFERRED EMBODIMENT

Figure 1:
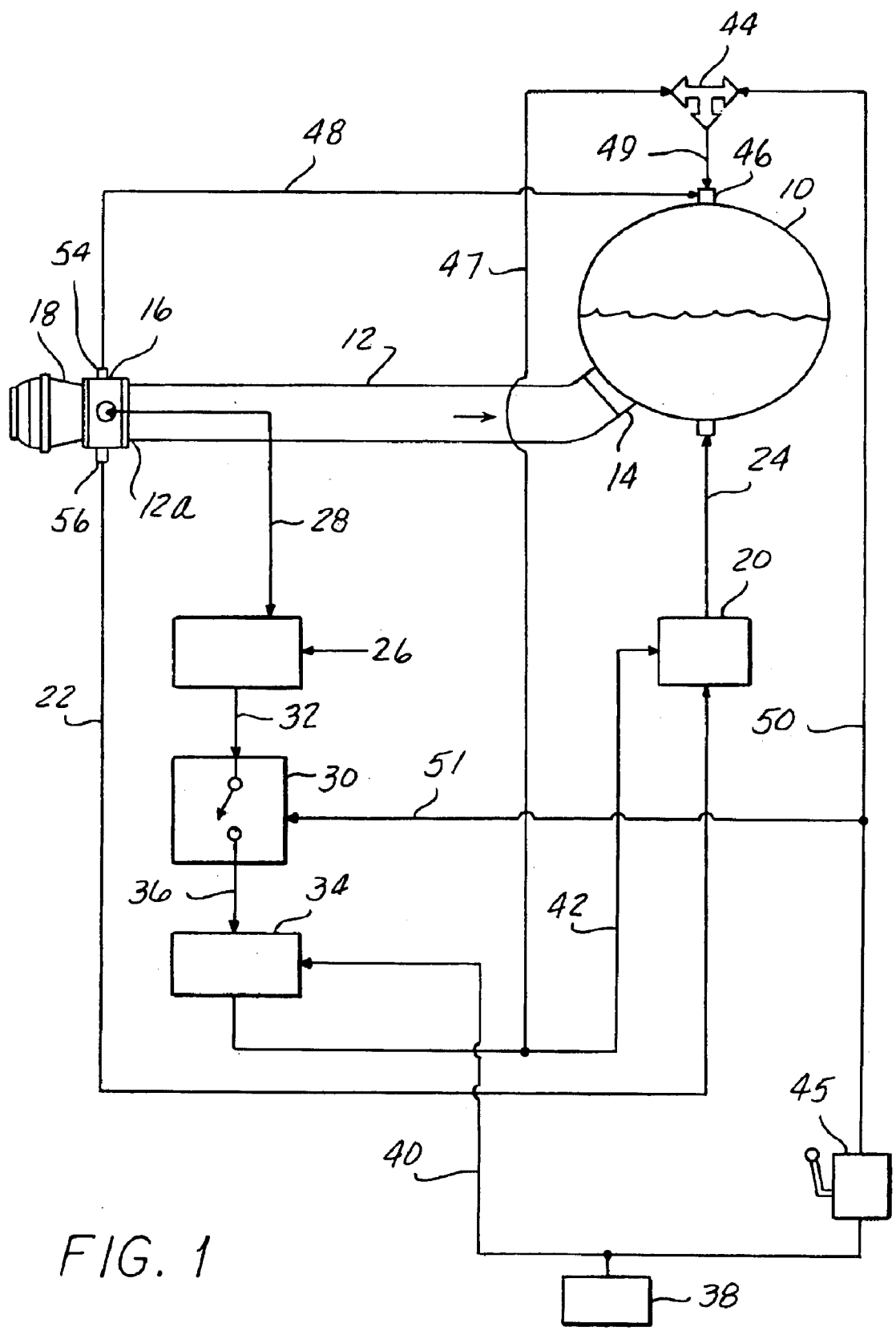
FIG. 1 is a schematic view of an evacuation system according to the invention.

FIG. 1 shows schematically a delivery/loading system for a cargo tank 10 of a road tanker vehicle with provision to evacuate the delivery/loading line or "wet line."

The evacuation system of FIG. 1 includes a bottom loading cargo tank 10 of a road tanker vehicle; a wet line 12 to facilitate delivery/loading of the cargo tank; a valve 14 connecting the inboard end of the wet line 12 to the bottom of the cargo tank 10; a sight glass module 16 positioned at the outboard end 12a of the wet line 12; an API (American Petroleum Institute) head 18 positioned outboard of the module 16; a suction pump 20; an evacuation line 22 interconnecting module 16 and suction pump 20; a discharge line 24 connecting the discharge of pump 20 and the bottom of the tank 10; an optic control system (OCS) controller 26; a lead 28 interconnecting module 16 and the input of OCS controller 26; an air switch 30; a lead 32 interconnecting the output of OCS controller 26 and air switch 30; a solenoid valve 34; a lead 36 interconnecting air switch 30 and solenoid valve 34; a source of truck compressed air 38; an air line 40 interconnecting truck air source 38 and solenoid valve 34; an air line 42 interconnecting solenoid air valve 34 and suction pump 20; a shuttle valve 44; a fire valve 45; an air line 46 interconnecting air line 42 and shuttle valve 44; an air line 47 interconnecting air line 42 and shuttle valve 44; a vapor vent valve 46 mounted on top of tank 10; a vapor vent line 48 interconnecting module 16 and vapor vent valve 46; an air line 49 interconnecting shuttle valve 44 and vapor vent valve 46; an air line 50 interconnecting fire valve 45 and shuttle valve 44; and a air line 51 interconnecting air line 50 and air switch 30.

Figure 4:
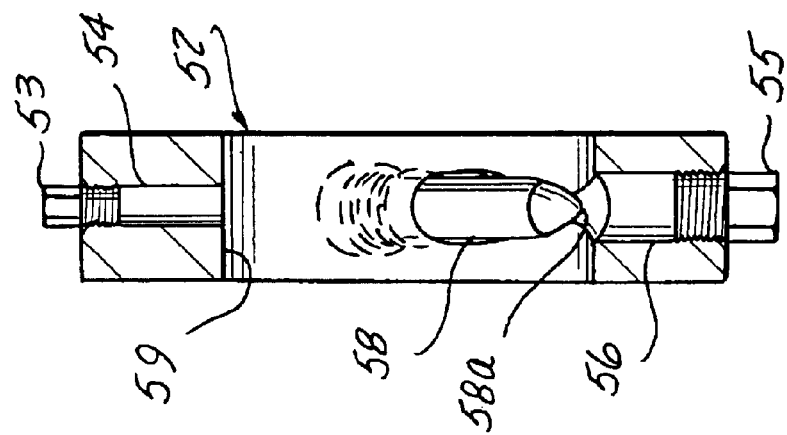
FIG. 4 is a cross sectional view taken on line 4—4 of FIG. 3.
Figure 3:
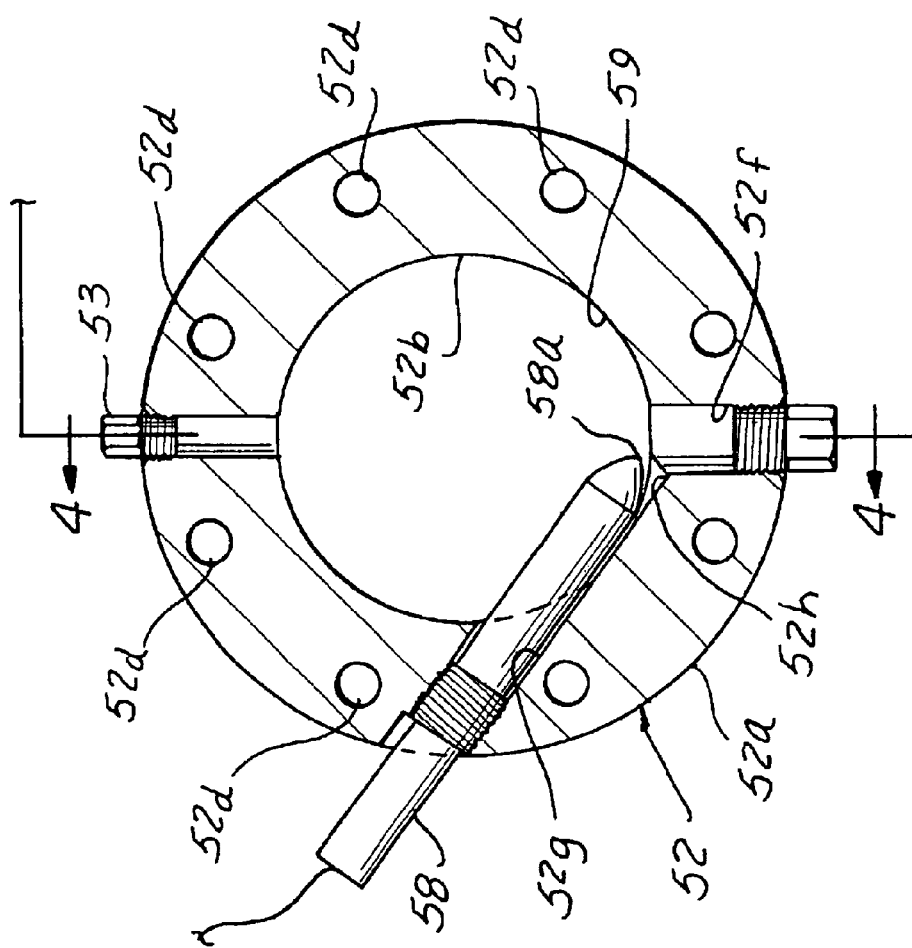
FIG. 3 is a detail view of a sight glass module utilized in the invention.

Sight glass module 16 (FIGS. 2–4) includes an annular transparent sight glass 52, a vent 54, a drain 56, and an optical sensor 58. The sight glass module 16 also has a throughbore 59 in fluid communication with the conduit or wet line 12 and the API head 18.

Sight glass 52 is formed of suitable transparent plastic material and includes an outer circular periphery 52a and a concentric inner circular periphery 52b coacting with outer periphery 52a to define an annular wall 52c. The inner circular periphery 52b forms the outer periphery of the throughbore 59. A plurality of circumferentially spaced through bores 52d extend axially through the annular wall 52c of the sight glass.

Vent 54 comprises an externally threaded tubular member 53 and is threadably received in a threaded bore 52e extending diametrically through the annular wall 52c of the sight glass at a 12 o'clock position as installed on the wet line 12.

Drain 56 comprises an externally threaded tubular member 55 and is threadably received in a threaded bore 52f extending diametrically through the annular wall 52c of the sight glass at a 6 o'clock position as installed on the wet line 12. Bores 52e and 52f will be seen to be coaxial.

Optical sensor 58 has an elongated, pencil configuration and is threadably received in a chordal bore 52g intersecting outer periphery 52a at approximately 9 o'clock and intercepting inner periphery 52b at approximately 7 o'clock. Bore 52g has the effect of positioning the inboard tip 58a of sensor 58 proximate the inboard end of bore 52f in overlying relation to drain 56. Inner periphery 52b may be scalloped out at 52h to nestingly receive the inboard tip 58a of sensor 58. Sensor 58 may for example comprise a two-wire optic overfill probe available from EBW Inc. of Muskegon, Mich. has Part Number 890-110-01.

API head 18 is of known form and includes an inboard connector flange 18a defining a plurality of circumferentially spaced holes 18b conforming in size and circumferential spacing to the bores 58d in the annular wall of the sight glass 16.

Wet line 12 is also of known construction and includes an outboard flange 12b defining a plurality of circumferentially spaced holes 12c conforming in size and circumferential spacing to the bores 52d in the annular wall of the sight glass.

In assembled relation, the annular wall 52c of the sight glass is sandwiched in clamping fashion between flanges 18a and 12b and the wet line 12. Sight glass module 16, and API head 18 are held in their sandwiched configuration by a plurality of bolts 60 passing through holes 12c, bores 52d and holes 18b for engagement with suitable nuts (not shown).

As previously noted, a lead 28 is connected to the outboard end 58b of sensor 58 for connection to the input of OCS controller 26; a liquid line 22 connects drain 56 with the input of suction pump 20; and an airline 48 connects vent 54 with vapor vent valve 46.

OCS controller 26 may for example comprise a two wire OCS system available from EBW Inc. of Muskegon, Mich. as Part Number 890-400-02.

In operational overview, when the sensor 58 in the sight glass 16 senses fuel in the vicinity of the sensor tip 58a, the sensor 58 operates to transmit a signal to the OCS controller 26 via lead 28 which in turn signals to actuate the solenoid air valve 34 provided the air switch 30 is closed. The solenoid air valve 34 routes truck air from the truck air source 38 to the suction pump 20 via air line 42 to pump the fuel in the wet line 12 back into the tank 10 via the lines 22 and 24. When the sensor tip 58a no longer senses the presence of liquid proximate the tip 58a, the signal to the OCS controller is terminated and the supply of compressed air to the suction pump 20 is terminated.

Fire valve 45 operates in a known manner as a safety device.

Specifically, when the truck is stopped for loading or unloading of the flammable liquid, the truck operator manually operates or closes the fire valve 45 to reroute air pressure from the braking system 38 of the truck to the vapor vent system and thereby allow the vehicle brakes to be spring applied. When the fire valve 45 is operated to close, the air pressure is directed through line 50 and further through line 51 to the air switch 30 and line 49 to the vapor vent valve 46. The normally closed air switch 30 opens upon actuation by the air pressure. Insofar as the fire valve 45 is operated the air switch 30 is opened so that the air switch 30 breaks the connection between the OCS controller 26 and the solenoid air valve 34 to render the evacuation system inoperative. After completion of the loading or unloading operation, the operator opens fire valve 45 to allow pressure to build back up to release the brakes from the spring application and remove air from the vapor vent system thereby closing air switch 30. The air pressure is now rerouted to the solenoid air valve 34, whereupon the evacuation system becomes operative so that any fluid sensed in the wet line 12 operates to actuate the solenoid air valve 34 which actuates the pump 20 to remove the residual liquid.

A shuttle valve 44 operates to maintain the vapor vent valve 46 on the cargo tank 10 open when required. Specifically, the shuttle valve 44 selectively isolates two separate air sources from the vapor vent valve 46. One source is provided by air line 50 and the second source is provided by air line 47. One such shuttle valve 44 is shown in FIG. 5, which uses a ball 62 to block one of the air passages 47, 49 or 50 communicating with the shuttle valve 44.

When the fire valve 45 is closed the delivery/loading system operates to provide air to the shuttle valve 44 via line 50 and "shuttle" the valve 44 to a first open position wherein air is routed to vent valve 46 to open the valve 46 and vent the tank 10. In the first open position, the ball 62 sits on seat 64 to open the passage from line 50 to line 49. The passage way from line 47 is closed and blocked by ball 62. When the fire valve 45 is open and the sensor 58 is sensing residual liquid in the wet line 12, air is supplied to the shuttle valve 44 via line 47 and valve 44 "shuttles" the ball 62 in an opposite direction to a second open position wherein air is provided to vent valve 46 to open the valve and vent the tank 10. In the second open position, the ball 62 sits on seat 66 to open the passage way from line 47 to line 49. The passage way from line 50 is closed and blocked by ball 62.

When the sensor 58 is no longer sensing any residual liquid in the wet line 20, the signal to the OCS controller 26 is terminated and the supply of compressed air from the air valve 34 to the suction pump 20 via line 42 is terminated. Delivery of air to the shuttle valve 44 is also shut off in both line 50 and line 47 so that the shuttle valve 44 is maintained in a central, closed position where no air is routed to the vent valve 46 and the vent valve 46 remains closed so that the tank 10 is not vented. In this closed position, the ball 62 sits on seat 68 to closed the air passage 49 to the vent valve 46.

The invention will be seen to provide a cost effective evacuation system for a liquid petroleum transport. Specifically, by incorporating the sensor 58, drain 56, and vent 54 in the sight glass 52 rather than requiring these elements to be incorporated into the API head, the invention provides a means of evacuating residual liquid without requiring the purchase of totally new and expensive customized API heads 18 to convert the delivery/loading system also to an evacuation system capable of removing liquid from the wet line 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for purging liquid from an external conduit of a bottom loading cargo tank, the system comprising:

a coupling device proximate a free end of the conduit;

a drain;

a return line interconnecting the drain and the cargo tank;

a sensor operative to sense liquid in the conduit;

a pump in the return line;

a control system operative in response to a signal from the sensor to actuate the pump, wherein the sensor and the drain are located in a module positioned between the free end of the conduit and the coupling device and comprising a vapor return line extending between the cargo tank and the external conduit and connected to the external conduit by a fitting, wherein the fitting is located in the module.

2. A system for purging liquid from an external conduit of a bottom loading cargo tank, the system comprising:

a coupling device proximate a free end of the conduit;

a drain;

a return line interconnecting the drain and the cargo tank;

a sensor operative to sense liquid in the conduit;

a pump in the return line; and a control system operative in response to a signal from the sensor to actuate the pump, wherein the sensor and the drain are located in a module positioned between the free end of the conduit and the coupling device, wherein the module comprises a sight glass positioned between the free end of the conduit and the coupling device.

3. The system of claim 2, wherein a sensor and drain are positioned in an annual wall of the sight glass.

4. A system, for purging liquid from an external conduit of a bottom loading cargo tank, the system comprising:

a coupling device proximate a free end of the conduit;

a drain;

a return line interconnecting the drain and the cargo tank;

a sensor operative to sense liquid in the conduit;

a pump in the return line; and a control system operative in response to a signal from the sensor to actuate the pump, wherein the sensor and the drain are located in a module positioned between the free end of the conduit and the coupling device, wherein the pump is inoperative when a safety device is operated and further comprising a valve operable to maintain a vapor vent valve on the cargo tank open when there is fluid in the conduit.

5. The system of claim 4, wherein the valve is operable to close the vapor vent valve when there is no fluid in the conduit.

6. The system of claim 2, wherein the module has a vent formed by a bore in the annual wall of the sight glass and the drains and vent are coaxial.

7. The system of claim 6, wherein the drain is diametrically opposed from the vent.

8. The system of claim 6, wherein a vapor vent line interconnects the vent and the vapor vent valve on the cargo tank.

9. The system of claim 3, wherein the sensor has an elongated configuration and is threadably received in a chordal bore intersecting an outer and inner periphery of the module.

10. The system of claim 9, wherein the sensor has a tip overlaying the drain when received in the chordal bore.

11. A method for purging liquid from an external conduit of a bottom loading cargo tank, the method comprising the steps of:

providing a coupling device proximate to a free end of the conduit;

providing a drain;

providing a return line interconnecting the drain and the cargo tank;

providing a pump in the return line;

providing a module positioned between the free end of the conduit and the coupling device, said module having a sensor therein operative to sense liquid in the conduit;

activating the pump for pumping liquid from the conduit through the return line to the cargo tank when the sensor senses liquid in the conduit and further comprising the steps of opening a vapor vent valve on the cargo tank when the sensor senses liquid in the conduit and closing the vapor vent valve when the sensor senses no liquid in the conduit.

12. The method of claim 11 further comprising the steps of providing means for detecting when the cargo tank is loading or delivering liquid and deactivating the pump for pumping liquid from the conduit through the return line when the cargo tank is loading or delivering liquid.

\* \* \* \* \*